July 31, 1962 L. H. LEWIS 3,047,185
RECEPTACLE APPARATUS
Filed June 5, 1961
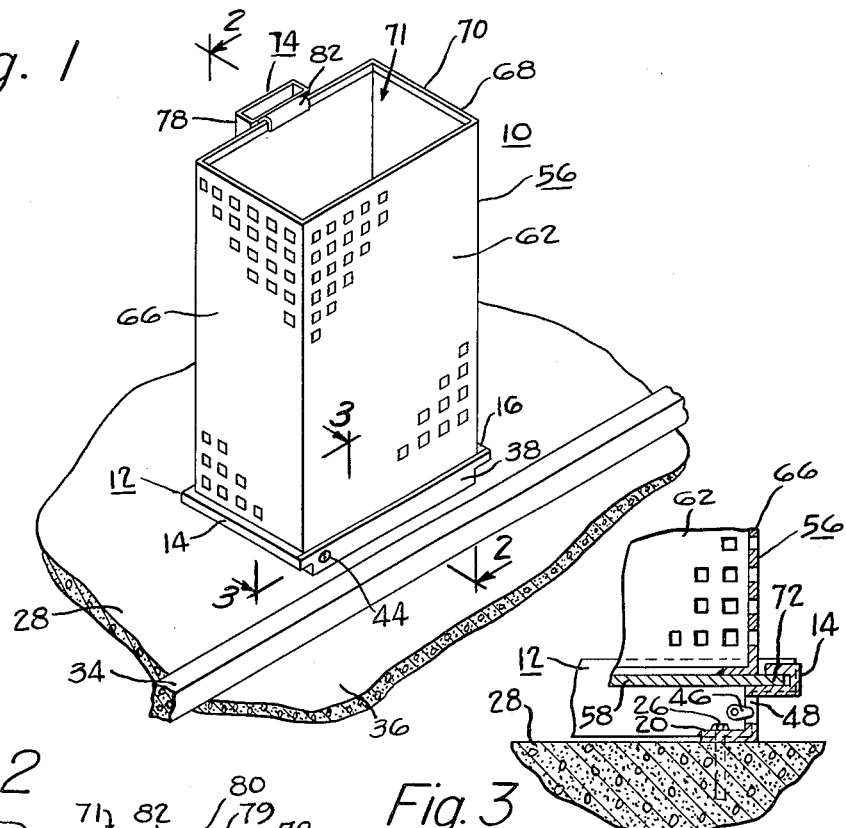
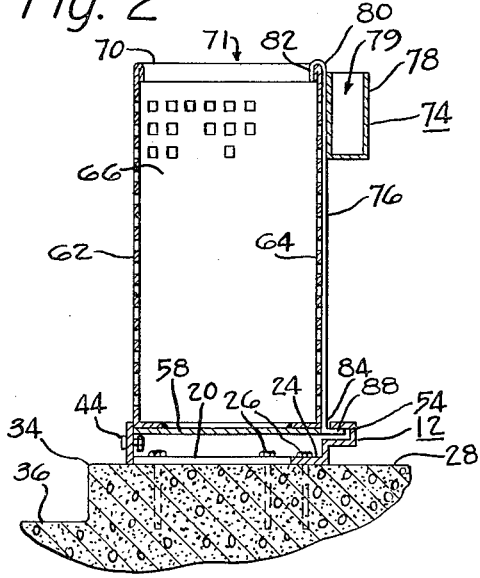
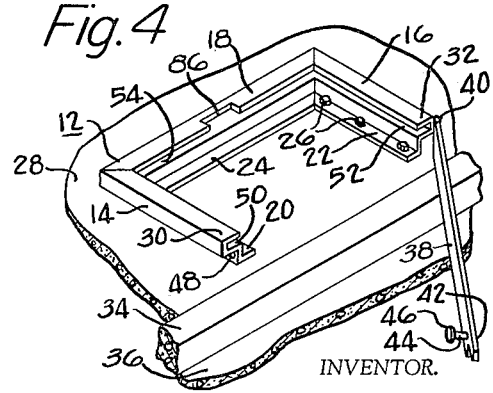
INVENTOR.
LINFORD H. LEWIS
BY Jacob Trachtman
ATTORNEY

United States Patent Office 3,047,185
Patented July 31, 1962

3,047,185
RECEPTACLE APPARATUS
Linford H. Lewis, 3408 Ashville St., Philadelphia 36, Pa.
Filed June 5, 1961, Ser. No. 115,031
16 Claims. (Cl. 220—18)

The invention relates to a receptacle apparatus, and more particularly to a receptacle apparatus adapted for being secured with a sidewalk and having a container for receiving pedestrian litter and a separate small receptacle for receiving cigarettes and ashes, which container and receptacle are readily removed for emptying only by authorized personnel.

Heretofore, receptacles have been provided which have been placed on sidewalks and have readily been removed or stolen. Such receptacles also did not provide means for receiving both litter and cigarettes and ashes in respective separate receptacles, nor has provision been made for quickly and efficiently removing and emptying the receptacles only by authorized personnel.

It is, therefore, a principal object of the invention to provide a new and improved receptacle apparatus having a container which may be secured with a sidewalk and is not removable except by authorized personnel.

Another object of the invention is to provide a new and improved receptacle apparatus providing a container which may be rapidly and efficiently removed by authorized personnel from the street side of a sidewalk.

Another object of the invention is to provide a new and improved receptacle apparatus including a container for pedestrian litter and a separate receptacle for receiving ashes and cigarettes which are secured together and can be rapidly and efficiently removed only by authorized personnel.

Another object of the invention is to provide a new and improved receptacle apparatus which includes a container having a rectangular opening at its top which is dimensioned to avoid its use for bagged refuse and is sufficiently large to receive pedestrian litter, and a receptacle smaller than the container particularly adapted for readily receiving cigarettes and ashes deposited by pedestrians using the sidewalk.

Another object of the invention is to provide a new and improved receptacle apparatus which includes a litter container and ash receptacle which may readily be emptied through their top openings or by complete removal of the container and receptacle from the supporting base.

The above objects, as well as many other objects of the invention, are achieved by providing a receptacle apparatus comprising a mounting base for being secured with a supporting surface having container receiving and locking means. A container is receivable by and securable within the base, and a cigarette and ash receptacle means which has engaging means secures said receptacle means with said base and said container when said container is secured with said base. The receptacle means is disengageable from the base and the container when the container is removed from its secured condition within the base.

The engaging means of said receptacle means includes a vertical member having a top portion with an end engaging the top of said container and a bottom portion engaging said base when said container is secured within said base for locking said receptacle with said container and said base. The receptacle means includes a receptacle secured with the top portion of said vertical member for being positioned proximate the top of said container.

The base is provided with an internally extending flange for securing said base with the supporting surface of a sidewalk along a street and includes means allowing the unlocking of said base and the removal of said container by authorized personnel from the street side of said sidewalk. The cigarette and ash receptacle is positioned with said container away from said street side for ready access by pedestrians using the sidewalk.

The foregoing and other objects of the invention will become more apparent as the following detailed description of the invention is read in conjunction with the drawings, in which:

FIGURE 1 is a perspective view of a receptacle apparatus embodying the invention, FIGURE 2 is a sectional view on the plane of lines 2—2 of FIGURE 1, FIGURE 3 is an enlarged sectional view on the plane of lines 3—3 with portions broken away, and FIGURE 4 is a perspective view of the base of the receptacle apparatus shown in FIGURE 1 with its bar member in its open condition.

Referring to the figures, the receptacle apparatus 10, embodying the invention, includes a base 12 which is preferably formed of a metallic material and has a substantially U configuration provided by the side arms 14, 16 and the connecting section 18. The arms 14, 16 and connecting section 18 are respectively provided with flanges 20, 22 and 24 which are adapted for being secured by bolts 26 with the surface 28 of a pavement with the ends 30, 32 respectively of the arms 14, 16 positioned proximate the curb 34 of a street 36.

The base is also provided with a bar member 38 which is hinged at its end 40 with the end 32 of the arm 16 of the base 12. The other end 42 of the bar member 38 is provided with a locking means 44 having a revolvable locking cam 46 for engaging an opening 48 (see FIGURES 3 and 4) in the end 30 of the arm 14 locking the end 42 of the bar member 38 with the end 30 of the arm 14 of the base 12. The locking means may be operated by a key retained by authorized personnel for placing the bar member 38 in its locked condition shown in FIGURE 1 or in its released or open position illustrated by FIGURE 4.

The base 12 is provided with a substantially U cross section above the flanges 20, 22 and 24 forming horizontal channels 50, 52 and 54 respectively in the arms 14, 16 and connecting section 18. The channels at the ends 30, 32 of the arms 14, 16 are enclosed by the bar member 38 when the bar member is in its locked position, while the channels are open as shown in FIGURE 4 when the bar member 38 is in its open condition.

A container 56 is provided with a bottom portion 58 to which is secured a perforated body portion 60, both preferably made of a metallic substance. The body portion 60 forms four substantially vertical walls, 62, 64, 66 and 68 enclosed at the bottom by the bottom portion 58 and providing a top substantially rectangular edge 70 forming a litter receiving opening 71 for the container 56. The substantially parallel walls 62, 64 provide sides which are of greater width than the width of the substantially parallel interconnecting walls 66, 68.

The bottom portion 58 of the channel 56 extends outwardly beyond the walls 66, 68 providing two ledges 72 which respectively slidably engage the channels 50, 52 of the arms 14, 16. The container 56 may thus be received within the channels of the arms 14, 16 when the bar member 38 is pivoted to its fully open position and is retained against removal when the bar member 38 is placed in its engaged and locked position shown in FIGURE 1. Since the bar member 38 may be placed parallel to the curb 34 of the street 36, authorized litter removing personnel traversing the street 36 with a collecting vehicle may readily unlock the bar member 36 and slidably remove the container 56 for emptying after which the container 56 may be replaced in the base 12 and locked therein by the bar member 38. Of course, if desired, litter may also be removed through the top opening in the container 56 without removing the container 56 from its base 12.

The receptacle apparatus 10 is also provided with a receptacle means 74 having a vertical bar member 76 and a receptacle 78 of a size substantially smaller than that of the container 56 secured with the top portion 80 of the vertical bar member 76. The receptacle 78 is provided with substantially rectangular side walls and a bottom preferably made of metal while providing an opening 79 at its top for receiving cigarettes and ashes.

The vertical bar member 76 is centrally positioned and extends vertically along the outside of the wall 64 of the container 56. The end 82 of the top portion 80 of the vertical bar member 76 extends over the top edge 70 and downwardly within the container 56 providing a hook engaging the top of the container 56. The bottom portion 84 of the bar member 76 is adapted to extend through a cut out opening 86 in the connecting section 18 of the base 12 when the container 56 is in its secured position within the base 12. The end 88 of the bottom portion 84 of the bar member 76 extends in a direction outwardly from the container 56 and within the channel 54 of the connecting section 18 of the base 12.

Thus, when the receptacle means 74 is in the position shown in FIGURE 2 and the container 56 is locked within the base 12, the receptacle means 74 is secured with the container 56 and the base 12 against removal. However, when the container 56 is removed from its secured position within the base 12 by releasing the bar member 38, the end 88 disengages the channel 54 of the connecting section 18 allowing the bar member to be moved upwardly to disengage its top end 82 from the container. Thus, the container 56 and the receptacle means 74 may both simultaneously be secured within the base and removed for emptying of their contents or replacement. Such removal may be made from the street side by authorized personnel.

The position of the receptacle 78 with respect to the container 56 is away from the street side allowing ready access thereto by pedestrians for depositing cigarettes and ashes. The receptacle apparatus 10 thus provides both a litter container and a cigarette and ash receptacle which are highly convenient for use by pedestrians, is proportioned to reduce the possibility of deposit of bagged refuse and provides a separate receptacle for cigarettes and ashes for avoiding the danger of igniting the litter deposited in the container. It is also noted that the base 12 is secured by bolts 26 extending through the flanges of the base 12 for firmly securing the base with a permanent structure and which bolts 26 are not accessible to unauthorized personnel when the container is secured in place with the bar member 38 in its locked condition.

It will, of course, be understood that the description and drawings, herein contained, are illustrative merely, and that various modifications and changes may be made in the structure disclosed without departing from the spirit of the invention.

What is claimed is:

1. A receptacle apparatus comprising a mounting base for being secured with a supporting surface having track means and a track enclosing means, said base having first and second parallel arms and a connecting section forming a substantially U configuration and being provided with means for securing said base with said supporting surface positioned proximate said track means and said enclosing means enclosing the open ends of the first and second arms of said base to form a substantially rectangular configuration, and a container having track engaging means for being received by the track means of said base and secured within said base by the enclosing means of said base.

2. A receptacle apparatus comprising a mounting base for being secured with a supporting surface having track means and a track enclosing means, said base having first and second parallel arms and a connecting section forming a substantially U configuration and being provided with an internally extending flange for securing said base with said supporting surface with said track means extending proximately above said flange and said enclosing means enclosing the open ends of the first and second arms of said base to form a substantially rectangular configuration, and a container having track engaging means for being received by the track means of said base and secured within said base by the enclosing means of said base.

3. The apparatus of claim 2 in which the enclosing means of said base comprises a bar member having a first end hinged with the end of the first arm for movement between open and closed positions and a second end with locking means for being secured with the end of the second arm of said base when said bar member is in its closed position.

4. The apparatus of claim 3 in which said container includes first and second track engaging means projecting outwardly in opposite directions along the bottom of said container for being slidably received within the track means of the first and second arms of said base when the bar member of said base is in the open position and being secured within said base by said track means and said bar member of said base when said bar member is secured in its closed position by said locking means.

5. The apparatus of claim 4 including a cigarette and ash receptacle means having engaging means locking said receptacle means with said base and said container when said container is secured within said base, and said receptacle means being disengageable from said base and said container when said container is removed from its secured position within said base.

6. The apparatus of claim 5 in which the engaging means of said receptacle means includes a vertical member having a top portion with an end engaging the top of said container and a bottom portion engaging said base when said container is secured within said base for locking said receptacle with said container and said base.

7. The apparatus of claim 6 in which the vertical member of said receptacle means extends proximate the outside wall of said container and said receptacle means includes a receptacle secured with the top portion of said vertical member for being positioned proximate the top of said container, and the end of said top portion of said vertical member extends over and downwardly within said container providing a hook for engaging the top of said container and the bottom of said vertical member has an end extending outwardly from said container for engaging the track means of the connecting section of said base for securing said receptacle means with said container and said base when said container is secured within said base, the end of the bottom portion of said vertical member disengaging the track means of said base when said container is removed from its secured position within said base and may be moved vertically when in this condition to disengage the hook end of the top portion of said vertical member from said container.

8. The apparatus of claim 7 in which the flange of said base is adapted for being secured with a sidewalk along a street with the hinged member parallel and proximate the street curb of said sidewalk for allowing the unlocking of said base and the slidable removal of said container by authorized personnel from the street side of said sidewalk, said cigarette and ash receptacle being positioned with said container away from said street side for ready access by pedestrians using said sidewalk.

9. The apparatus of claim 8 in which said base and said container are of rectangular form with said parallel arms and corresponding sides of said container of smaller length than the parallel bottom portion and bar member of said base and corresponding sides of said container which are positioned parallel with said street curb.

10. The apparatus of claim 9 in which said container has perforated vertical walls while the receptacle of said receptacle means has substantially rectangular side walls and bottom formed of an incombustible material and a top opening for receiving within it cigarettes and ashes.

11. A receptacle apparatus comprising a mounting base for being secured with a supporting surface having contained receiving and locking means, a container receivable by and securable within said base, and a cigarette and ash receptacle means having engaging means securing said receptacle means with said base and said container when said container is secured with said base, said receptacle means being disengageable from said base and said container when said container is removed from its secured condition within said base.

12. The apparatus of claim 11 in which the engaging means of said receptacle means includes a vertical member having a top portion with an end engaging the top of said container and a bottom portion engaging said base when said container is secured within said base for locking said receptacle means with said container and said base.

13. The apparatus of claim 12 in which the vertical member of said receptacle means extends proximate the outside wall of said container and said receptacle means includes a receptacle secured with the top portion of said vertical member for being positioned proximate the top of said container, and the end of said top portion of said vertical member extends over and downwardly within said container providing a hook for engaging the top of said container and the bottom of said vertical member has an end extending outwardly from said container for engaging said base for securing said receptacle means with said container and said base when said container is secured within said base, the end of the bottom portion of said vertical member disengaging said base when said container is removed from its secured position within said base and may be moved vertically when in this condition to disengage the hook end of the top portion of said vertical member from said container, said receptacle means being disengageable from said base and said container when said container is removed from its secured condition within said base.

14. The apparatus of claim 13 in which said base is provided with an internally extending flange for securing said base with the supporting surface of a sidewalk along a street and including means allowing the unlocking of said base and the removal of said container by authorized personnel from the street side of said sidewalk, said cigarette and ash receptacle being positioned with said container away from said street side for ready access by pedestrians using said sidewalk.

15. The apparatus of claim 14 in which said base and said container are of rectangular form and having their sides which are parallel to said street curb of greater length than the length of the remaining sides of said base and said container.

16. The apparatus of claim 15 in which said container has perforated vertical walls while the receptacle of said receptacle means has substantially rectangular side walls and bottom formed of an incombustible material and a top opening for receiving within it cigarettes and ashes.

References Cited in the file of this patent

UNITED STATES PATENTS

| | | |
|---|---|---|
| 2,095,482 | Spiccaito | Oct. 12, 1937 |
| 2,967,748 | Dreiling | Jan. 10, 1961 |
| 2,987,357 | Kinsing | June 6, 1961 |